United States Patent [19]

Ito et al.

[11] 4,338,503
[45] Jul. 6, 1982

[54] INDUCTIVE HEATING APPARATUS

[75] Inventors: Susumu Ito; Toshio Ogino, both of Fujishi, Japan

[73] Assignee: Tokyo Shibaura Denki Kabushiki Kaisha, Japan

[21] Appl. No.: 173,745

[22] Filed: Jul. 30, 1980

[30] Foreign Application Priority Data

Aug. 3, 1979 [JP] Japan .................................. 54-99259

[51] Int. Cl.³ ............................................. H05B 5/04
[52] U.S. Cl. ............................ 219/10.77; 219/10.49 R; 363/80; 363/97
[58] Field of Search ................. 219/10.77, 10.49, 492; 363/80, 97, 86, 134; 323/9; 307/252 UA

[56] References Cited

U.S. PATENT DOCUMENTS

| | | | |
|---|---|---|---|
| 3,391,329 | 7/1968 | Myer | 219/10.77 |
| 3,448,367 | 6/1969 | Corey | 219/10.77 |
| 3,665,293 | 5/1972 | Keiler et al. | 219/10.77 |
| 4,115,676 | 9/1978 | Higuchi et al. | 219/10.77 |

FOREIGN PATENT DOCUMENTS

| | | | |
|---|---|---|---|
| 2700187 | 7/1977 | Fed. Rep. of Germany | 219/10.77 |
| 52-43141 | 4/1977 | Japan | 219/10.77 |
| 1423231 | 2/1976 | United Kingdom | 219/10.77 |
| 2004711 | 4/1979 | United Kingdom | 219/10.77 |
| 568142 | 9/1977 | U.S.S.R. | 219/10.77 |

Primary Examiner—B. A. Reynolds
Assistant Examiner—M. Paschall
Attorney, Agent, or Firm—Cushman, Darby & Cushman

[57] ABSTRACT

Inductive heating apparatus includes serially connected first and second transistors which are alternately caused to conduct by a control circuit. A resonant circuit including an induction heating coil and a capacitor is connected in parallel with the second transistor. When the first transistor conducts a first current flows to charge the capacitor and when the second transistor conducts a second current flows in the resonant circuit to discharge the capacitor. The control circuit produces a turn-off signal to the conducting transistor before the current through the conducting current falls to zero and also produces a turn on signal to the nonconducting transistor when the current through the conducting transistor reaches zero.

9 Claims, 8 Drawing Figures

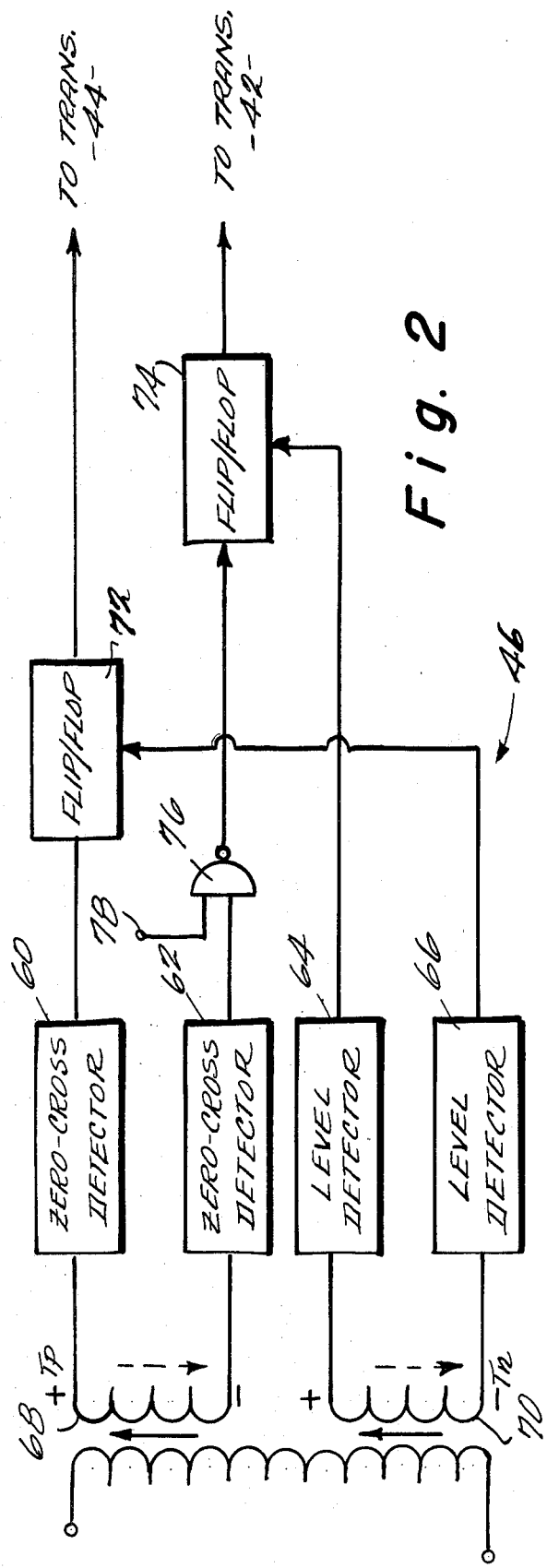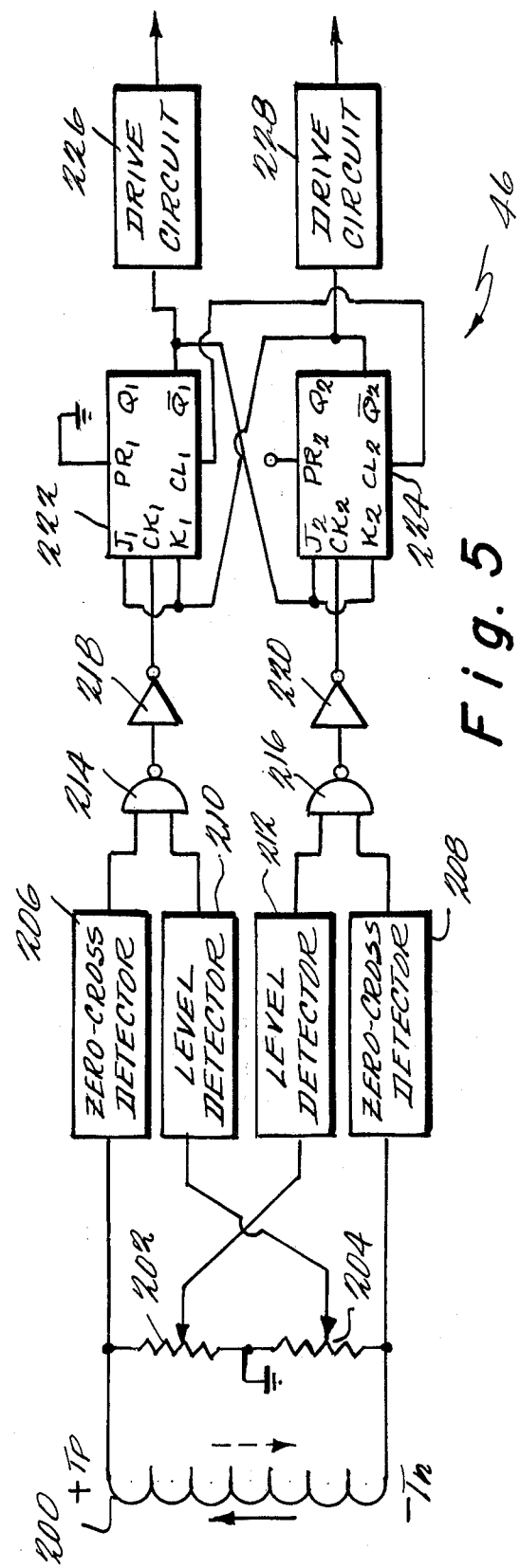

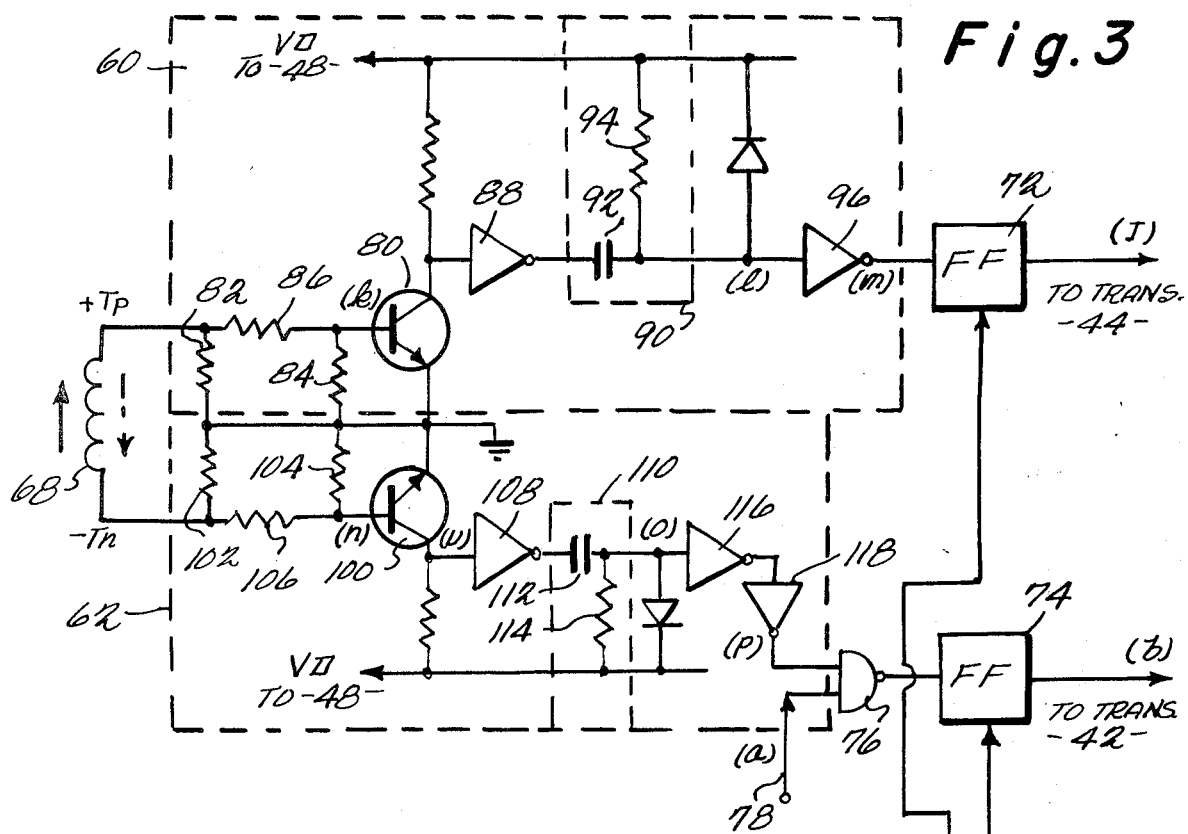
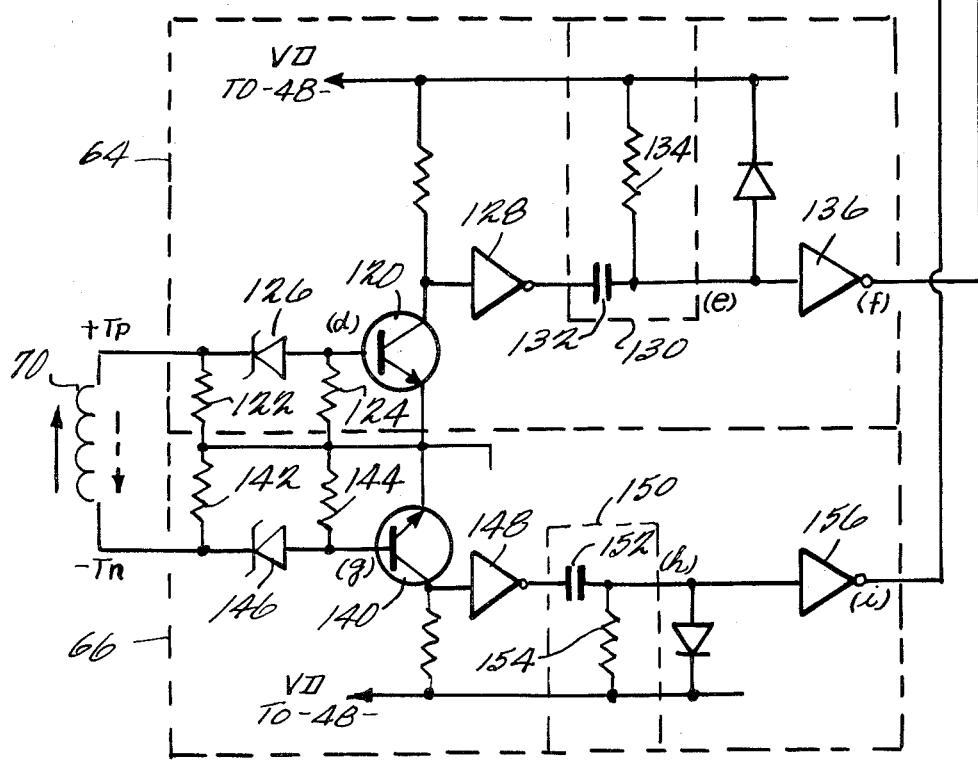
Fig.3

INDUCTIVE HEATING APPARATUS

BACKGROUND OF THE INVENTION

1. Field of the Invention

This invention relates to an inductive heating apparatus, and more particularly to an inductive heating apparatus wherein energy is stored in a resonant circuit.

2. Description of the Prior Art

Various types of inductive heating devices have been proposed. For example, in U.S. Pat. No. 4,074,101, a pair of inversely polarized, parallel-connected silicon controlled rectifiers (SCR) are connected in parallel with a resonant circuit including an induction heating coil and a capacitor. This circuit generates an electromagnetic field about the heating coil when the SCR's are alternately caused to conduct so that a metal pan which is electromagnetically coupled with the heating coil is heated by eddy currents induced therein. However, the SCR's are often damaged by surge voltages caused by an abrupt change of load during heating.

To eliminate such defects, Japanese published application No. 51-128742 to Tokyo Shibaura Denki K.K. teaches an inductive heating device using first and second serially connected switching transistors, with a serial heating coil and capacitor connected in parallel with the second transistor. A power supply is connected across the pair of transistors. In this apparatus, currents alternately flow in a first loop consisting of the power supply, the first transistor, the heating coil and the capacitor, and in a second, resonant, loop consisting of the second transistor, heating coil and capacitor.

In this arrangement, the transistors must never conduct simultaneously, since the resulting short circuit will damage the transistors. To obviate this problem, this Japanese application teaches that after each conduction period, neither transistor should conduct for a period. Thus, after the current flowing through the heating coil ceases, a specific time period lapses before the other transistor begins to conduct. Although the transistors will not conduct simultaneously, there is still a problem, specifically, that heating efficiency is lowered when neither transistor is conducting.

SUMMARY OF THE INVENTION

The present invention overcomes these problems, preventing the simultaneous conduction of the switching devices, while maximizing heating efficiency. In the present invention, a serially connected inductive heating coil and capacitor are connected in parallel with the second of a pair of serially connected transistors. Control means cause the transistors to conduct alternately. When the first transistor conducts, current flows from a power source through the first transistor and heating coil, charging the capacitor. When the second transistor conducts, current flows through the second transistor, heating coil and capacitor, discharging the capacitor. To maximize efficiency, the control circuit turns off the conducting transistor at a predetermined current level through the heating coil before the current falls to zero, and turns on the non-conducting transistor when the current through the conducting transistor reaches zero. The time period between the predetermined current level point and the zero crossing point should equal the storage time and the falling time of the transistors. For one embodiment, R-S flip-flops are used to control the transistors, while in another embodiment J-K master slave flip-flops are employed.

In this manner it is guaranteed that the transistors will not simultaneously conduct, while current continuously flows through the heating coil. Current continuously flows because the predetermined current level is selected in relation to the turnoff time of the transistor.

BRIEF DESCRIPTION OF THE DRAWING

Other objects and advantages of the present invention will be apparent from the following detailed description of the presently preferred exemplary embodiments taken in conjunction with the accompanying drawing, in which:

FIG. 2 shows a block diagram of one embodiment of the control circuit for the inductive heating apparatus shown in FIG. 1;

FIG. 3 shows a detailed circuit diagram of the control circuit shown in FIG. 2;

FIG. 5 shows a block diagram of another embodiment of the control circuit for the inductive heating apparatus shown in FIG. 1;

DETAILED DESCRIPTION OF THE PREFERRED EMBODIMENT

Figure 1:
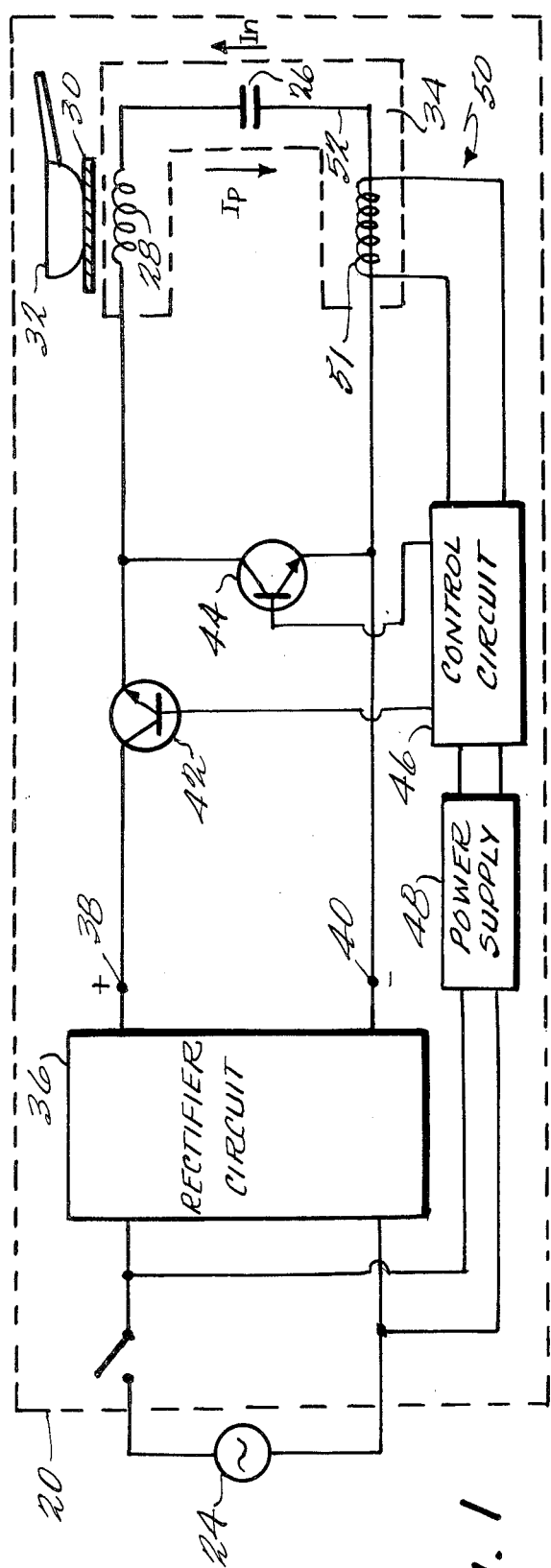
FIG. 1 shows a circuit diagram of an inductive heating apparatus in accordance with the present invention.

Referring now to FIGS. 1-4 of the drawing, a first preferred embodiment of the present invention is illustrated. Inductive heating apparatus 20 is a solid state high frequency circuit energized by a commercial AC power source 24. Apparatus 20 includes a capacitor 26 and an induction heating coil 28 which form a series resonant circuit 34. Disposed above coil 28 is a non-metallic utensil support 30 on which a metal pan 32 may be placed.

Circuit 20 also includes a rectifier circuit 36. Serially connected n-p-n transistors 42 and 44 are connected between a positive output terminal 38 and a negative output terminal 40 of rectifier 36. Resonant circuit 34 is connected between the collector and emitter of transistor 44. The bases of transistors 42 and 44 are connected to a control circuit 46. Control circuit 46 is energized by a power source 48 connected to AC power source 24. A current transformer 50, employed as a current sensor is coupled to a conductor 52 of resonant circuit 34. In response to the currents induced in transformer 50, control circuit 46 generates signals to cause transistors 42 and 44 to alternately conduct.

As shown in FIG. 2, control circuit 46 has zero crossing detectors 60 and 62 and level detectors 64 and 66. Zero crossing detectors 60 and 62 are connected to secondary winding 68 of current transformer 50, specifically to positive and negative terminals $T_p$ and $T_n$, respectively, for detecting the zero crossing point of currents in resonant circuit 34. Level detectors 64 and 66 are connected to secondary winding 70 of transformer 50, specifically to positive and negative terminals $T_p$ and $T_n$, respectively, for detecting current in resonant circuit 34 falling through a predetermined current level.

Zero crossing detectors 60 and 62 generate signals to set bistable devices such as bistable multivibrators or R-S flip-flops 72 and 74, respectively, while level detectors 64 and 66 reset flip-flops 74 and 72, respectively.

The outputs of flip-flops 72 and 74 are connected to the bases of transistors 44 and 42, respectively. A NAND circuit 76 is connected between zero crossing detector 62 and flip-flop 74 for initializing control circuit 46. For this purpose, a low level signal is applied to an input terminal 78 of NAND circuit 76 in order to cause flip-flop 74 to produce a signal so that transistor 42 conducts.

In operation, an initialization signal is applied to terminal 78 to set flip-flop 74 causing transistor 42 to conduct. When level detector 64 senses the current in secondary 70 falling through a threshold, it generates a signal to reset flip-flop 74, turning off transistor 42.

When zero crossing detector 60 senses the current in secondary 68 falling through zero, it produces a signal to set flip-flop 72, causing transistor 44 to conduct. When level detector 66 senses the current in secondary 70 falling through a threshold, it generates a signal to reset flip-flop 72, turning off transistor 44. 62 senses the current in secondary 68 falling through zero and produces a signal to set flip-flop 74, causing transistor 42 to conduct. The process continues as described above.

Keep in mind that the signals, from secondaries 68 and 70, sensed by zero crossing detector 62 and level detector 66, are inverted from the signals sensed by zero crossing detector 60 and level detector 64, respectively.

FIG. 3 is a detailed circuit diagram of FIG. 2. Zero crossing detector 60 includes a n-p-n transistor 80 as a switching device. Current induced in secondary winding 68 is converted to a voltage by resistors 82, 84 and 86. This voltage is applied between base and emitter of transistor 80. Since the emitter of transistor 80 is grounded, transistor 80 turns on or conducts when a positive potential is applied to its base.

An inverter 88 is connected to the collector of transistor 80 so as to invert the output of transistor 80. Differentiating circuit 90, consisting of a capacitor 92 and a resistor 94, is connected to inverter 88. The differentiated output is inverted by an inverter 96 which is connected to the set terminal of flip-flop 72.

Similarly, zero crossing detector 62 is constructed with an n-p-n transistor 100, resistors 102, 104 and 106, an inverter 108, a differentiating circuit 110, consisting of a capacitor 112 and a resistor 114, and in an inverter 116. Zero crossing detector 62 further includes an inverter 118 which is connected between inverter 116 and NAND circuit 76. The output of NAND circuit 76 is applied to the set terminal of flip-flop 74.

Level detector 64 includes an n-p-n transistor 120 as a switching device. The emitter of transistor 120 is grounded. Current induced in secondary winding 70 is converted to a voltage by resistors 122 and 124. This voltage is applied between base and emitter of transistor 120. However, transistor 120 remains nonconductive until the potential from winding 70 exceeds a certain voltage determined by a zener diode 126.

An inverter 128 is connected to the collector of transistor 120 so as to invert the output of transistor 120. Differentiating circuit 130 consisting of a capacitor 132 and a resistor 134 is connected to inverter 128. The differentiated output is inverted by an inverter 136 which is connected to the reset terminal of flip-flop 74.

Similarly, level detector 66 is constructed with an n-p-n transistor 140, an inverter 148, a differentiating circuit 150, consisting of a capacitor 152 and a resistor 154, and an inverter 156, the output of which is connected to the reset terminal of flip-flop 72.

Control circuit 46 is driven by power source 48 as mentioned above. Specifically, DC voltage Vo is applied thereto as shown in FIG. 3.

Figure 4:
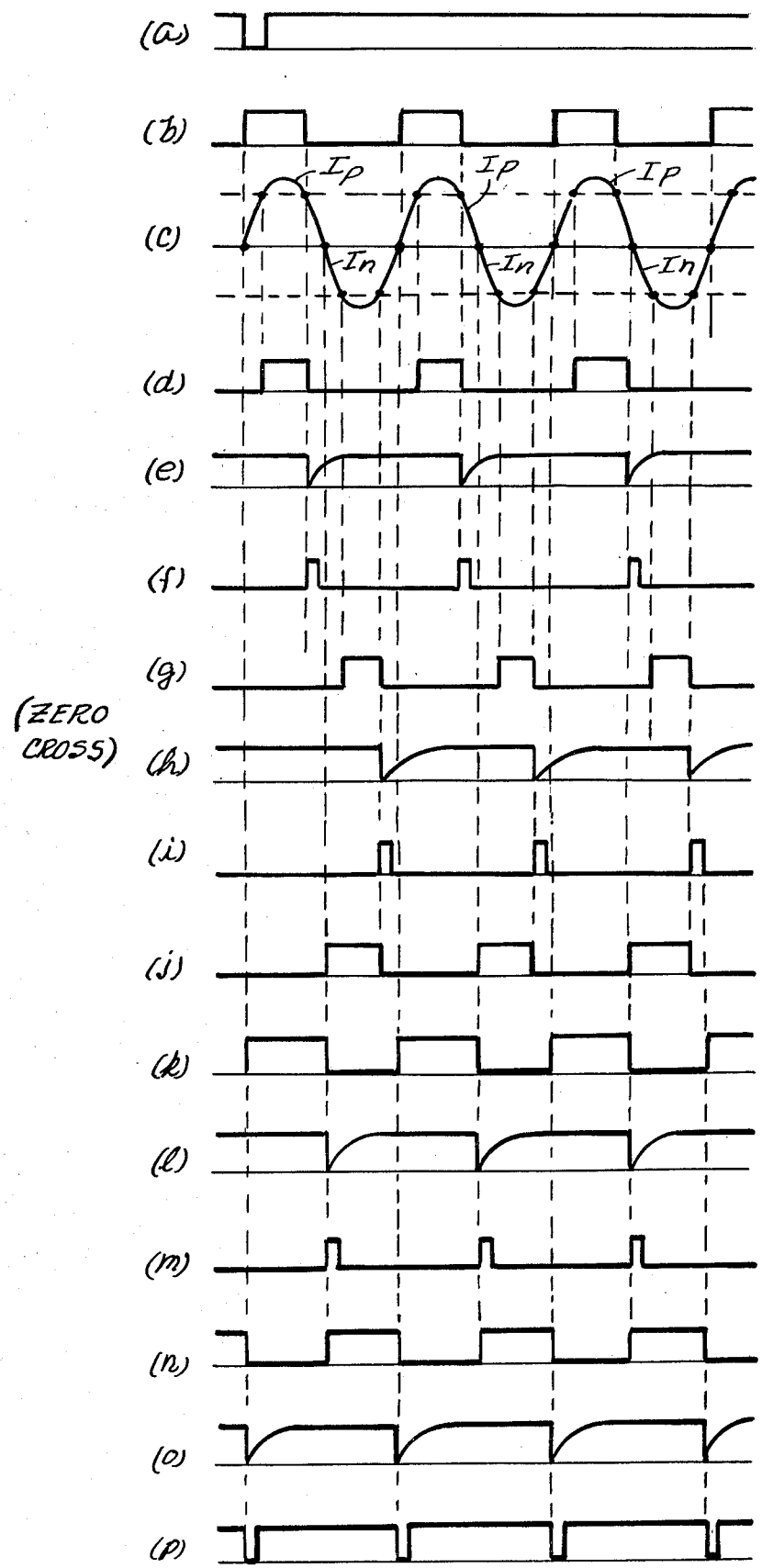
FIG. 4 shows various waveforms of the control circuit illustrated in FIGS. 2 and 3.

The operation of the control circuit shown in FIG. 3 may be understood by reference to FIG. 4. For initializing circuit 46, a low level signal is applied to input terminal 78 of NAND circuit 76 (signal (a)). Regardless of the output of inverter 118 (signal (p)), NAND circuit 76 produces a signal to set flip-flop 74 (signal (b)). Transistor 42 then conducts and a current Ip flows in resonant circuit 34, (signal (c)) charging capacitor 26.

Current Ip is detected by current transformer primary coil 51. In secondary windings 68 and 70 of current transformer 50, current is induced as indicated by the solid arrow in FIGS. 2 and 3. As a result of zener diode 126 between secondary winding 70 and the base of transistor 120, transistor 120 remains non-conductive until its base-emitter voltage exceeds the threshold voltage of zener diode 126 (signal (d)). When transistor 120 is switched to a conductive state, the collector of transistor 120 is caused to be zero potential. Inverter 128 inverts the output of transistor 120 to a high level signal and the inverted signal is then differentiated by differentiator 130 (signal (e)). When the current Ip falls to a predetermined level, which corresponds to the threshold level of zener diode 126, a pulse is produced by inverter 136 (signal (f)). This high level signal resets flip-flop 74 and transistor 42 becomes non-conductive. Accordingly, charging of the capacitor stops.

Transistor 80 of zero crossing detector 60 conducts when current Ip flows in resonant circuit 34 (signal (k)). In secondary winding 68, current is initially induced as indicated by the solid arrow in FIGS. 2 and 3 (signal (c)). Upon conduction, the collector of transistor 80 assumes a low potential. Inverter 88 inverts this signal and the inverted signal is differentiated by differentiator 90 (signal (1)). When current Ip in resonant circuit 34 falls through a zero crossing point which corresponds to a zero crossing point of current induced in secondary winding 68 of current transformer 50, a high level signal is generated by inverter 96 (signal (m)). This high level signal sets flip-flop 72 to turn on transistor 44. As a result, capacitor 26 discharges and current In flows in resonant circuit 34.

Current In in resonant circuit 34 is detected by transformer 50 and currents in secondary windings 68 and 70 are induced as indicated by dotted arrows shown in FIGS. 2 and 3. The operation of control circuit 46 while current In flows in resonant circuit 34 is parallel to the operation described above. Specifically, transistor 44 is turned off before current In reaches a zero crossing point and transistor 42 is turned on when current In falls through a zero crossing point.

FIG. 5 shows another embodiment of control circuit 46 obliged in inductive heating of apparatus 20.

Across secondary winding 200 of current transformer 50, variable resistors 202 and 204 are connected in series. The interconnection point of resistors 202 and 204 are grounded. Zero crossing detectors 206 and 208 are connected to a positive terminal Tp and a negative Tn terminal of secondary winding 200, respectively, for detecting the zero crossing points of current Ip and current In in resonant circuit 34. Level detectors 210 and 212 are connected to the wiper of variable resistors 204 and 202, respectively. These level detectors detect current in resonant circuit 34 falling through a predetermined level. The outputs of zero crossing detector 206 and level detector 210 is applied to a NAND circuit 214. Similarly, the outputs of zero crossing detector 208 and level detector 212 is connected to a NAND circuit 216. Each output of NAND circuits 214 and 216 is inverted by inverters 218 and 220, respectively.

J-K master-slave flip-flops 222 and 224 of the type TC4027P available from TOSHIBA Corporation (hereinafter called J-K flip-flops) are connected to inverters 218 and 220, respectively.

Figure 6:
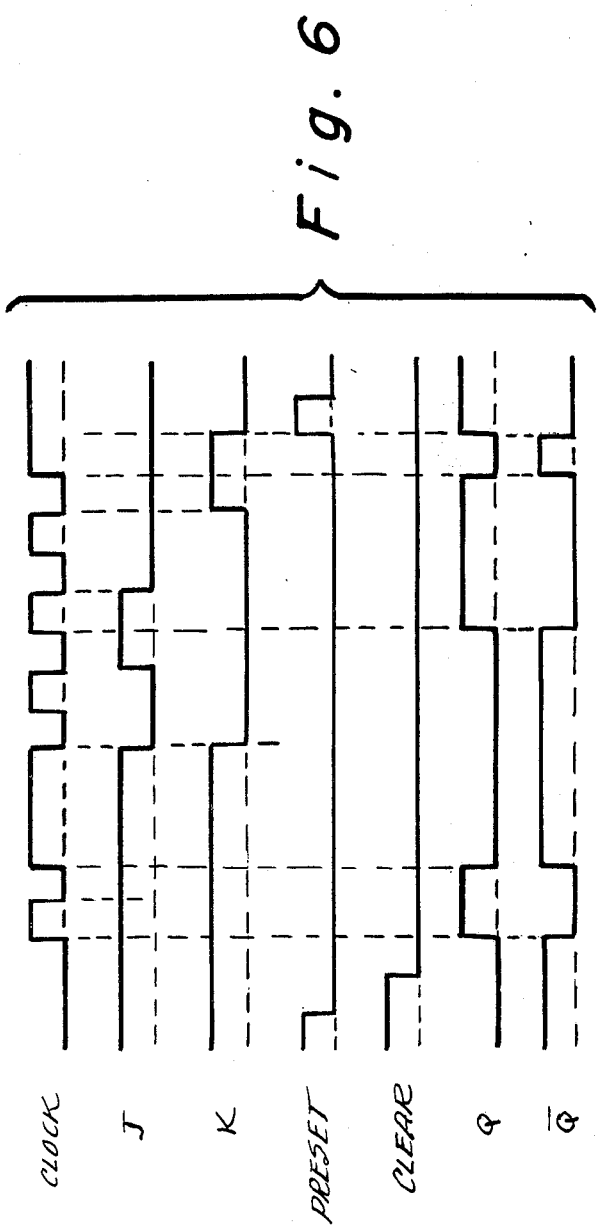
FIG. 6 shows a timing chart of a J-K master slave flip-flop.

Each of J-K flip-flops 222 and 224 has seven terminals besides a source terminal and a ground terminal. These terminals are named J, K, CK, CL, PR, Q and $\bar{Q}$. CL represents the clear input, CK represents the clock input and PR represents the preset. Q is the output terminal and $\bar{Q}$ is the inverted output terminal. A timing chart of this flip-flop is shown in FIG. 6. This J-K flip-flop has three features which are utilized in the present invention. In the first feature, which is referred to as clocking, output Q is inverted when a rising edge is applied to CK and when J and K are both at a high level. In the second feature, which is referred to as clearing, output Q assumes a low level when a high level input is applied to clear (CL), regardless of the level of preset (PL). In the third feature, which is referred to as presetting, output Q assumes a high level when a high level is applied to preset (PL), while clear CL is at a low level.

As illustrated in FIG. 5, each output $\bar{Q}_1$, and $\bar{Q}_2$, of J-K flip-flops 222 and 224 are connected to drive circuits 226 and 228. Drive circuits 226 and 228 which produce signals to turn on transistors 42 and 44 when $\bar{Q}_1$, and $\bar{Q}_2$ are low.

$J_1$ and $K_1$ of J-K flip-flop 222 are interconnected and are also connected to $\bar{Q}_2$ of J-K flip-flop 224. Similarly, $J_2$ and $K_2$ are interconnected and are also connected to $\bar{Q}_1$ of J-K flip-flop 222. Clear terminals $CL_1$ and $CL_2$ are also interconnected. $PR_2$ is connected to the circuitry for generating the initializing signal.

Figure 7:
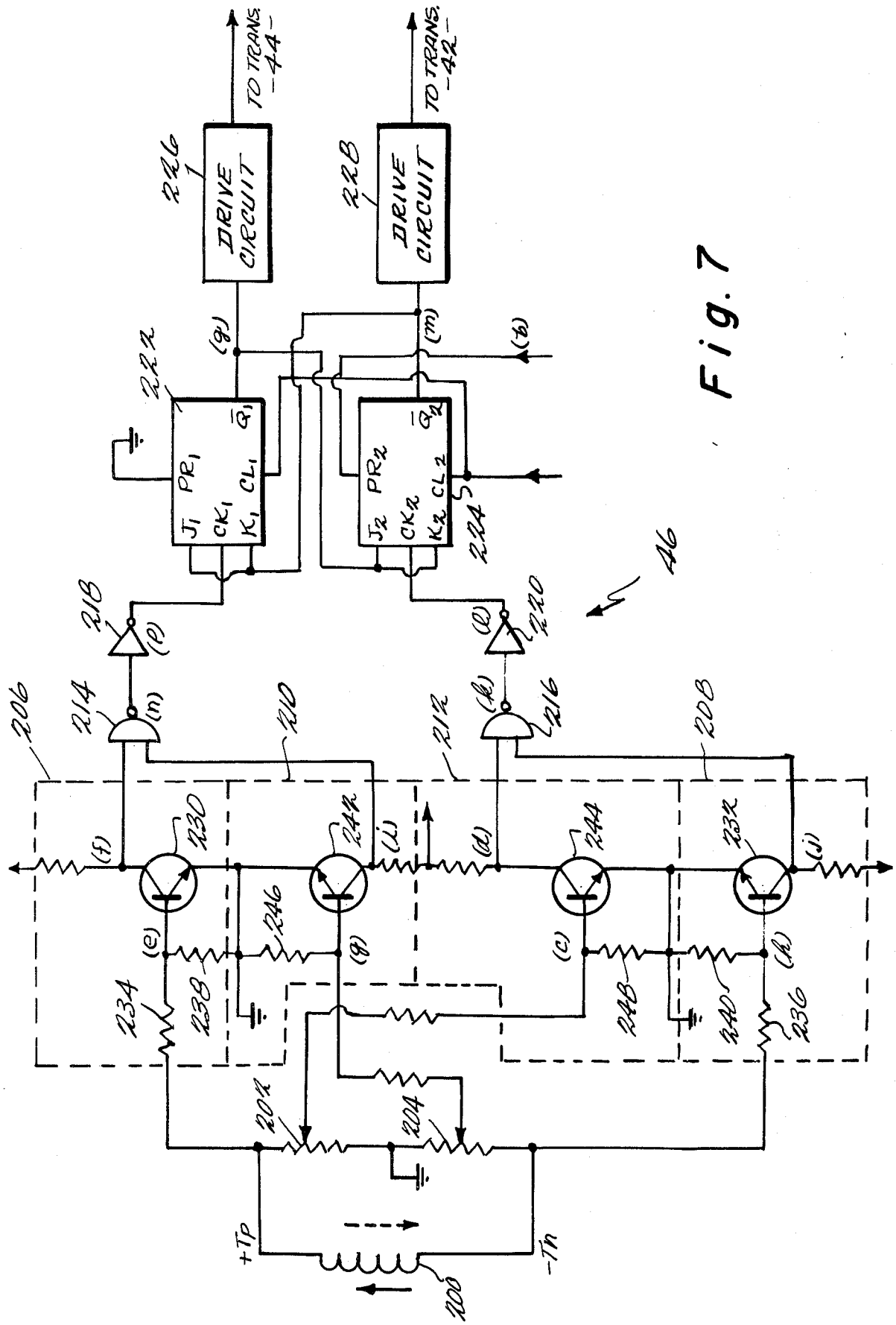
FIG. 7 shows a detailed circuit diagram of the control circuit shown in FIG. 5.

As shown in FIG. 7, zero crossing detectors 206 and 208 include n-p-n transistors 230 and 232, respectively. The bases of transistors 230 and 232 are connected to positive terminal Tp and negative terminal Tn of secondary winding 200 through resistors 234 and 236, respectively. Current induced in secondary winding 200 is indicated by a solid arrow when current Ip flows in resonant circuit 34 and is converted to voltage by variable resistors 202 and 204. This voltage is applied between the base and emitter of each of transistors 230 and 232 through resistors 238 and 240. As the emitters of transistors 230 and 232 are grounded, transistors 230 and 232 conduct when a positive potential is applied to the respective bases. The outputs of transistors 230 and 232 are connected to NAND circuits 214 and 216, respectively.

Similarly, level detectors 210 and 212 are constructed with n-p-n transistors 242 and 244, resistors 246 and 248. The outputs of transistors 242 and 244 are connected to NAND circuits 214 and 216, respectively.

Figure 8:
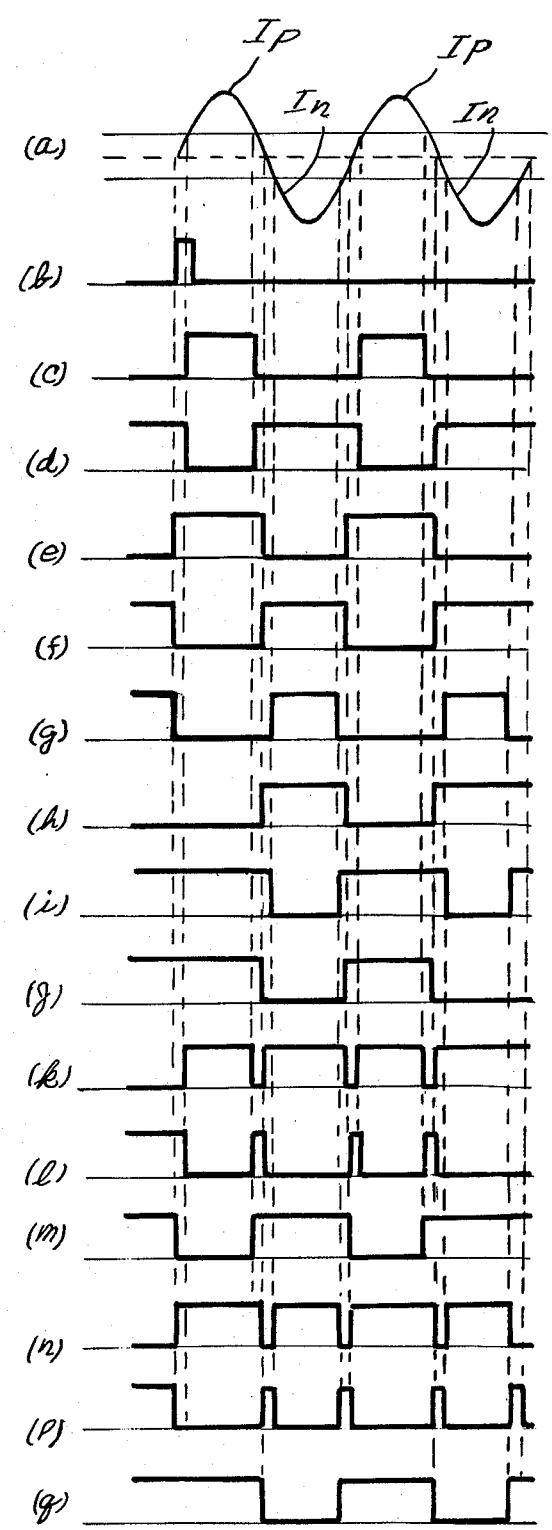
FIG. 8 shows various waveforms of the control circuit shown in FIGS. 5 and 7.

Operation of control circuit 46 shown in FIG. 7 may best be understood by reference to FIG. 8. For initializing control circuit 46, a high level signal is applied to $PR_2$ of J-K flip-flop 224 when CL is at a low level (signal (b)). As explained above, this causes the $\bar{Q}_2$ output to become low which turns on transistor 42 through drive circuit 228. Current Ip then flows in resonant circuit 34 (signal (a)). Current Ip is detected by current transformer 50 and current is induced in secondary winding 200 as indicated by the solid arrow in FIG. 7. Since variable resistors 202 and 204 are connected between secondary winding 200, transistor 244 of level detector 212 remains non-conductive until its base-emitter voltage exceeds a predetermined voltage set by resistor 202 (signal (c)). When transistor 244 becomes conductive, its collector assumes a low potential (signal (d)).

Transistor 230 of zero crossing detector 206 is switched to a conductive state as soon as current is induced in secondary winding 200 (signal (e)) and its collector assumes a low potential (signal (f)). Transistors 242 and 232 are still non-conductive because a negative voltage is applied across the base and emitter of each (signals (g) and (h)). Accordingly, the potential on each collector of transistors 242 and 232 is high (signals (i) and (j)). These high level signals are applied to NAND circuits 214 and 216, respectively. By operation of NAND circuit 216 and inverter 220 (signals (k) and (l)), a pulse is generated when first current Ip in resonant circuit 34 falls to a predetermined level which corresponds to voltage set by variable resistor 202. As a rising edge is applied to $CK_2$ of J-K flip-flop 224, its output Q is reversed from a high level to a low level ($J_2$ and $K_2$ are at a high level). Accordingly, $\bar{Q}_2$ assumes a high level (signal (m)) which turns off transistor 42 through drive circuit 228.

Similarly, a pulse is generated by NAND circuit 214 and inverter 218 (signals (n) and (p)) when first current Ip falls through the zero crossing point. Since $J_1$ and $K_1$ are connected to $\bar{Q}_2$, $J_1$ and $K_2$ are at a high level, a rising edge applied to $CK_1$ of J-K flip-flop 220 reverses output $\bar{Q}_2$ from a high level to a low level (signal (q)). The transistor is then turned on and current In flows in resonant circuit 34.

Current In is also detected by current transformer 50 and current in secondary winding 200 is induced as indicated by the dotted arrow in FIGS. 5 and 6. Operation of control circuit 46 is repeated in a parallel manner as described above.

Each of serially connected transistors 42 and 44 are alternately turned off by a signal from control circuit 46 before each of currents Ip and In flowing in resonant circuit 34 reaches a zero crossing point. A certain time is required for these transistors 42 and 44 to completely turn off, because of a storage time ($t_s$) and a falling time ($t_f$). These times $t_s$ and $t_f$ are specified by transistors used in apparatus 20.

Accordingly, it is preferable to supply a turn-off signal to transistors 42 and 44 such time ($t_s + t_f$) before the zero crossing points of currents Ip and In. Such time is set by zener diodes 126 and 146 in one embodied control circuit 46 and is set by variable resistors 202 and 204 in the other embodied control circuit 46.

Many changes and modifications in the above described embodiments can be carried out without departing from the scope of the present invention. The scope is intended to be limited only by the scope of the following claims.

What is claimed is:
1. An inductive heating apparatus comprising:
 a serially connected switching circuit including a first switching element and a second switching element which alternately conduct in a given order;

a resonant circuit including an inductive heating coil and a capacitor, parallelly connected to said second switching element;

sensing means for sensing a first current flowing in said first switching element and a second current flowing in said second switching element and for producing first and second signals in response to said first and second currents reaching first and second predetermined magnitude levels respectively prior to becoming zero, and producing third and fourth signals in response to said first and second currents reaching said zero magnitude level respectively;

control means, responsive to said sensing means and connected to said first and second switching elements, for causing: (1) said first switching element to become conductive in response to said fourth signal, (2) said first switching element to become non-conductive in response to said first signal, (3) said second switching element to become conductive in response to said third signal, and (4) said second switching element to become non-conductive in response to said second signal.

2. An inductive heating apparatus as in claim 1 wherein said control means comprises a first bistable device having an output connected to said first switching device and being responsive to said first and fourth signals and a second bistable device having an output connected to said second switching device and being responsive to said second and third signals.

3. An inductive heating apparatus as in claim 2 wherein said sensing means comprises:
a first detector for detecting said first predetermined current level and said first current zero level; and
a second detector, different from said first detector for detecting said second predetermined current level and said second current zero level.

4. An inductive heating apparatus as in claim 3 wherein each said bistable device is a bistable multivibrator having a set terminal connected to one of said current zero level detectors and a reset terminal connected to one of said predetermined current level detector.

5. An inductive heating apparatus as in claim 3 wherein an output of said bistable device is inverted by a rising edge on an input signal, said bistable device being connected to pulse generating means having an input connected to one of said first and second current zero level detector and the other of said first and second predetermined current level detector.

6. An inductive heating apparatus as in claim 5 wherein said bistable device is a J-K master slave flip-flop.

7. An inductive heating apparatus as in claim 4 or claim 6, wherein said first and second switching devices are transistors.

8. An inductive heating apparatus as in claim 7 wherein said sensing means produces said first and second signals a storage time plus a falling time of said transistors prior to said third and fourth signals respectively.

9. An inductive heating apparatus comprising:
a switching circuit including a first switching element and a second switching element which alternately conduct in a given order, each of said first and second switching elements having first and second current conducting terminals, said first element first terminal being connected to a first terminal adapted to be connected to a power source, said first element second terminal being connected to said second element, first terminal and said second element, second terminal being connected to a second terminal adapted to be connected to said power supply;

a resonant circuit including an inductive heating coil and a capacitor, said resonant circuit having a first terminal connected to said second switching element first terminal and a second terminal connected to said second switching element second terminal;

sensing means for sensing a first current flowing in said first switching element and a second current flowing in said second switching element and for producing first and second signals when said first and second currents reach first and second predetermined magnitude levels respectively prior to becoming zero, and producing third and fourth signals when said first and second currents reach to said zero magnitude level respectively; and control means, responsive to said sensing means and connected to said first and second switching elements, for causing said first switching element to become conductive in response to said fourth signal, for causing said first switching element to become non-conductive in response to said first signal, for causing said second switching element to become conductive in response to said third signal, and for causing said second switching element to become non-conductive in response to said second signal.

* * * * *